(12) United States Patent
Yamada et al.

(10) Patent No.: US 6,469,745 B1
(45) Date of Patent: Oct. 22, 2002

(54) IMAGE SIGNAL PROCESSOR FOR DETECTING DUPLICATE FIELDS

(75) Inventors: Yoshihisa Yamada; Yoshiaki Kato; Tokumichi Murakami, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/145,887

(22) Filed: Sep. 2, 1998

(30) Foreign Application Priority Data

Sep. 4, 1997 (JP) .............................. 9-239447

(51) Int. Cl.[7] .............................. H04N 5/46; H04N 5/08; H04N 7/01; H04N 11/20; H04N 9/78
(52) U.S. Cl. ........................ 348/558; 348/443; 348/452; 348/459; 348/526; 348/666
(58) Field of Search ................. 348/526, 459, 348/700, 443, 452, 384, 570, 622, 666, 401.1, 558

(56) References Cited

U.S. PATENT DOCUMENTS

| 4,849,634 | A |   | 7/1989  | Reidl |          |
|-----------|---|---|---------|-------|----------|
| 5,255,091 | A | * | 10/1993 | Lyon et al. | 358/140 |
| 5,535,237 | A |   | 7/1996  | LaPadula, III et al. | |
| 5,563,660 | A | * | 10/1996 | Tsukagoshi | 348/384 |
| 5,768,469 | A | * | 6/1998  | Yagasaki et al. | 386/109 |
| 5,835,672 | A | * | 11/1998 | Yagasaki et al. | 386/111 |
| 5,892,550 | A | * | 4/1999  | Iwasaki et al. | 348/443 |

FOREIGN PATENT DOCUMENTS

JP          955879          2/1998

OTHER PUBLICATIONS

English Language Abstract of JP 6–30332.

* cited by examiner

*Primary Examiner*—John Miller
*Assistant Examiner*—Paulos Natnael

(57) ABSTRACT

An image signal processor is provided which accurately detects duplicate fields of a telecinema signal. The image signal processor includes a duplicate field detecting means for detecting duplicate fields of the telecinema signal and a duplicate field removing means for removing the duplicate fields. The duplicate field detecting means uses a threshold value for detecting a duplicate field and a threshold value for detecting a non-duplicate field to improve the accuracy of detection.

40 Claims, 15 Drawing Sheets

IMAGE SIGNAL PROCESSOR FOR DETECTING DUPLICATE FIELDS

BACKGROUND OF THE INVENTION

1. Field of the Invention

The present invention relates to an image signal processor for detecting and removing duplicate fields of an image signal such as an NTSC television signal of 30 Hz produced from a movie film of 24 Hz by means of a 3-2 pull-down system or the like.

2. Description of Related Art

While a movie is made of a film of 24 Hz, the NTSC (National Television System Committee) signaling system which is the television system presently adopted in Japan, the U.S. and other countries is an interlace signaling system having a frame rate of 30 Hz. Each NTSC signal frame is composed of two fields (hereinafter referred to respectively as a first field and a second field). Therefore, the 3-2 pull-down operation is implemented in order to convert a movie film signal into the NTSC image signal.

This point will be explained below with reference to FIG. 13. In FIG. 13, a movie film signal is shown in the upper stage and an NTSC image signal is shown in the lower stage. Fields 501 and 503 are generated as signals of the first field of the NTSC signal from one frame 401 of the movie film signal and Field 502 is generated as a signal of the second field. Regarding the array of like fields, the same signal is repeated in Fields 501 and 503 of the first field of the NTSC signal and the same signal is repeated in Fields 506 and 508 of the second field as shown in the figure. Thus, the odd frame of the movie film signal is displayed for a period of three fields and the even frame is displayed for a period of two fields on the converted NTSC signal. The signal of 24 Hz is converted into the signal of 30 Hz by making five frames of the NTSC signal from four frames of the movie film signal. The converted signal is called a telecinema signal.

Here, when an amount of information of the image signal is to be compressed by using an image coding system such as MPEG-2(Moving Picture Experts Group) standardized by the International Standardization Organization for example, there is a possibility that the coding efficiency cannot be enhanced when the telecinema signal is coded because redundant duplicate fields are also coded. Thus, there has been implemented a process of implementing the coding process after removing the duplicate fields and converting the 30 Hz signal into a signal of 24 Hz which corresponds to the movie film signal. Then, the 3:2 pull-down operation is implemented after decoding the converted 24 Hz signal to form an NTSC signal of 30 Hz again.

FIG. 14 is a diagram showing a structure of a prior art television signal converter disclosed in Japanese Patent Laid-Open No. Hei. 9-55879 for example. The converter comprises VF generating means 1 for generating a VF signal indicative of whether an input signal belongs to the first field or the second field, a duplicate field detecting means 2 for detecting a duplicate field, and a duplicate field removing means 3.

FIG. 15 is a diagram showing a structure of the duplicate field detecting means 2 in detail. The duplicate field detecting means 2 comprises field memories 10 and 11, a subtracter 12, absolutizing means 13, one-field cumulative adder means 14, duplicate field determining means 15, comparator means 16, a memory 17 for storing a cumulative addition signal for a period of one field, and threshold value determining means 18.

The operation of the converter will now be explained. In FIG. 14, the VF generating means 1 decides whether an input image signal 100 is a signal belonging to the first field or the second field and outputs the VF signal 102. Then, the duplicate field detecting means 2 detects a duplicate field and outputs a duplicate field discriminating signal 103. The duplicate field removing means 3 removes the duplicate field of an image signal 101 which has been delayed for a period of two fields by the duplicate field detecting means 2 in correspondence to the duplicate field discriminating signal 103 and outputs a television signal 104 of 24 Hz.

Here, the operation of the duplicate field detecting means 2 will be explained in detail with reference to FIG. 15. The image signal 100 is input to the field memory 10 and to the subtracter 12. The subtracter 12 takes a difference between the image signal 101 which has been delayed by a period of two fields by the two field memories and the input image signal 100 and outputs a difference signal 201.

The absolutizing means 13 finds an absolute value of the difference signal 201 and outputs an absolute difference signal 202. The one-field cumulative adder means 14 cumulatively adds the absolute difference signals 202 of only one field and outputs a cumulative addition signal 203. The cumulative addition signals 203 corresponding to the first and second fields are output alternately. The memory 17 holds the cumulative addition signals 203 sequentially and outputs a result of the cumulative addition of the first field and a result of the cumulative addition of the second field in correspondence to the VF signal 102 so that cumulative addition signals of the first and second fields can be compared by the comparator means 16. The comparator means 16 decides whether the image signal 100 is a duplicate field or not by comparing the cumulative addition signal of the first field with the cumulative addition signal of the second field and outputs a duplicate field discriminating signal 205 and a threshold value decision signal 206.

The decision is made as follows. The result of the cumulative addition of the first field is multiplied with a coefficient greater than 1 and compared with the result of the cumulative addition of the second field. When the result of comparison is smaller than a predetermined value, it is decided that the first field may be a duplicate field. The result of the cumulative addition of the second field is multiplied with a coefficient greater than 1 and compared with the result of cumulative addition of the first field. When the result of comparison is smaller than a predetermined value, it is decided that the second field may be a duplicate field. In such case, the duplicate field discriminating signal 205 is turned ON. It is also decided that when each of the above-mentioned results of comparison is greater than the predetermined value, the fields are not duplicated fields and the duplicate field discriminating signal 205 is turned OFF.

The threshold value determining means 18 decides a threshold value in correspondence to the threshold value decision signal 206 and outputs a threshold value signal 207. The duplicate field determining means 15 compares the cumulative addition signal 203 with the threshold value signal 207 and decides that the signal is a duplicate field when the cumulative addition signal 203 is smaller than the threshold value signal 207 and the duplicate field discriminating signal 205 is turned ON to output the duplicate field discriminating signal 103. Such arrangement allows the duplicate field to be detected without being affected by noise because the threshold value signal 207 is controlled in correspondence to an amount of conversion noise generated in converting the movie film signal into the telecinema signal and because whether or not the signal is a duplicate field depends on this threshold value signal 207 and the duplicate field discriminating signal 205.

However, the prior art television signal converter, constructed as described above, has had a problem because no large difference is produced between the cumulative value of the difference signal of the first field and the cumulative value of the difference signal of the second field. Namely, when the motion of a scene of the movie film is temporarily small or when a still scene appears, the ratio, even when found, becomes close to 1. Therefore, the input signal erroneously may be recognized as a duplicate field of the telecinema signal.

Further, because many of the movie image signals are displayed lengthily in the horizontal direction, a process called trimming, for inserting black parts at the upper and lower parts of the image, is often implemented in displaying an NTSC signal whose aspect ratio is 4:3 on a screen. Because the difference signal between the fields is always zero when the effect of noise is removed in such black parts, erroneous detection may be a problem when the intra-field difference signals are accumulated for the whole screen.

Moreover, the possibility of picture disturbance caused by the erroneous recognition increases when an input signal of an NTSC signal of 30 Hz is erroneously recognized as a telecinema signal of 30 Hz in processing by the duplicate field removing means. This problem will be explained below with reference to FIG. 16.

For example, when the NTSC signal of 30 Hz as shown in the upper stage of FIG. 16 is input, it is converted into a signal of 24 Hz as shown in the middle stage because it is erroneously detected as a telecinema signal. Then, it is converted into an NTSC signal of 30 Hz in the lower stage by the 3:2 pull-down process after the coding and decoding processes. When Field 603 is removed by the duplicate field removing means for example, the same signal as that of Field 801 is displayed in Field 803 even though the original NTSC signal of Field 603 is different from that of Field 601. When this signal is displayed in a still picture mode in units of frames and Field 803 is displayed in the same time interval as Field 804 for example, a time difference of 3/60 seconds is produced between these two fields because the same signal is displayed in Field 801 and in Field 803. That is, a signal having the time difference of 3/60 seconds like that between Field 601 and 604, not the time difference of 1/60 second like that between Field 603 and Field 604 of the original NTSC signal, is displayed in the same time interval. Thus, a great discrepancy occurs per line of an outline of a moving object in particular, causing a great visual disturbance.

Accordingly, it is an object of the present invention to eliminate the aforementioned problems by detecting a duplicate field of a telecinema signal or the like more accurately.

It is another object of the present invention to reproduce an image having less visual disturbance even when an NTSC signal is erroneously detected as a telecinema signal.

SUMMARY OF THE INVENTION

It is an object of the invention to provide an image signal processor which achieves an improved accuracy of detecting a duplicate field.

Another object of the invention is to provide an image signal processor having less visual disturbance even if the image signal is erroneously recognized as the telecinema signal.

According to the present invention, an image signal processor has a duplicate field detecting means for detecting a duplicate field of an image signal based on a threshold value for detecting a duplicate field and a threshold value for detecting a non-duplicate field. The duplicate field detecting means detects a duplicate field by using a threshold value for detecting duplicate field, and detects a non-duplicate field by using a threshold value for detecting a non-duplicate field in order to improve accuracy of detecting a duplicate field.

In one embodiment of the invention, the image signal processor further comprises an improved duplicate field removing means which selects a field which is to be removed based on whether the duplicate field belongs to a first field or second field. The duplicate field removing means removes one of the first fields, which temporally antecedes, when said duplicate field belongs to said first field, and removes said duplicate field detected by the duplicate field detecting means when the duplicate field belongs to the second field.

The specific nature of the invention, as well as other objects, uses and advantages thereof, will clearly appear from the following description and from the accompanying drawings which are given by illustration only, and thus are not limitative of the present invention.

BRIEF DESCRIPTION OF DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the invention will become apparent to those skilled in the art from this detailed description.

First Embodiment

Figure 1:
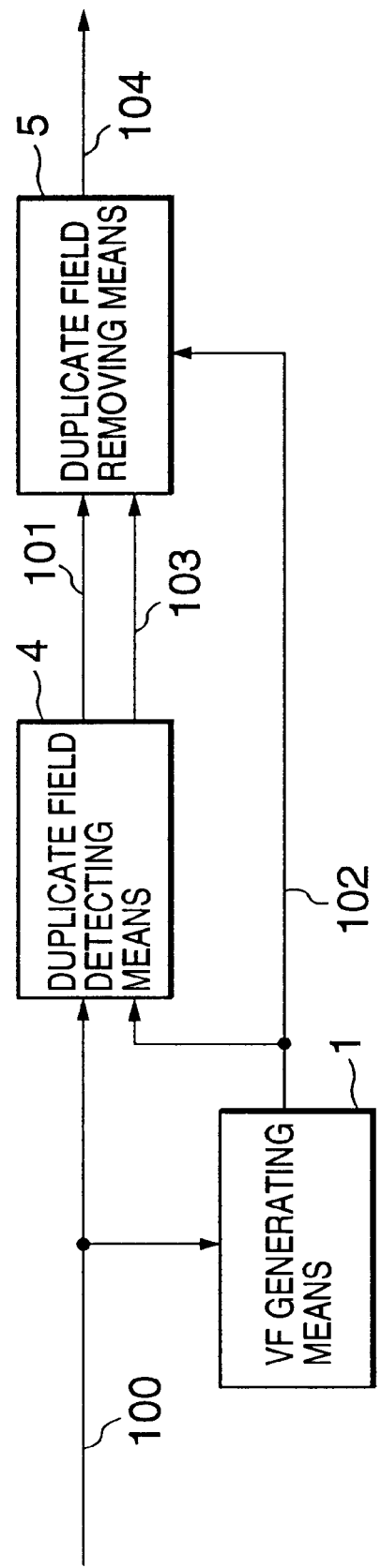
FIG. 1 is a diagram showing a structure of an image signal processor according to one embodiment of the present invention.

Referring now to the drawings, wherein like reference characters designate like or corresponding parts throughout the several figures, FIG. 1 is a diagram showing a structure of an image signal processor according to one embodiment of the present invention.

Figure 2:
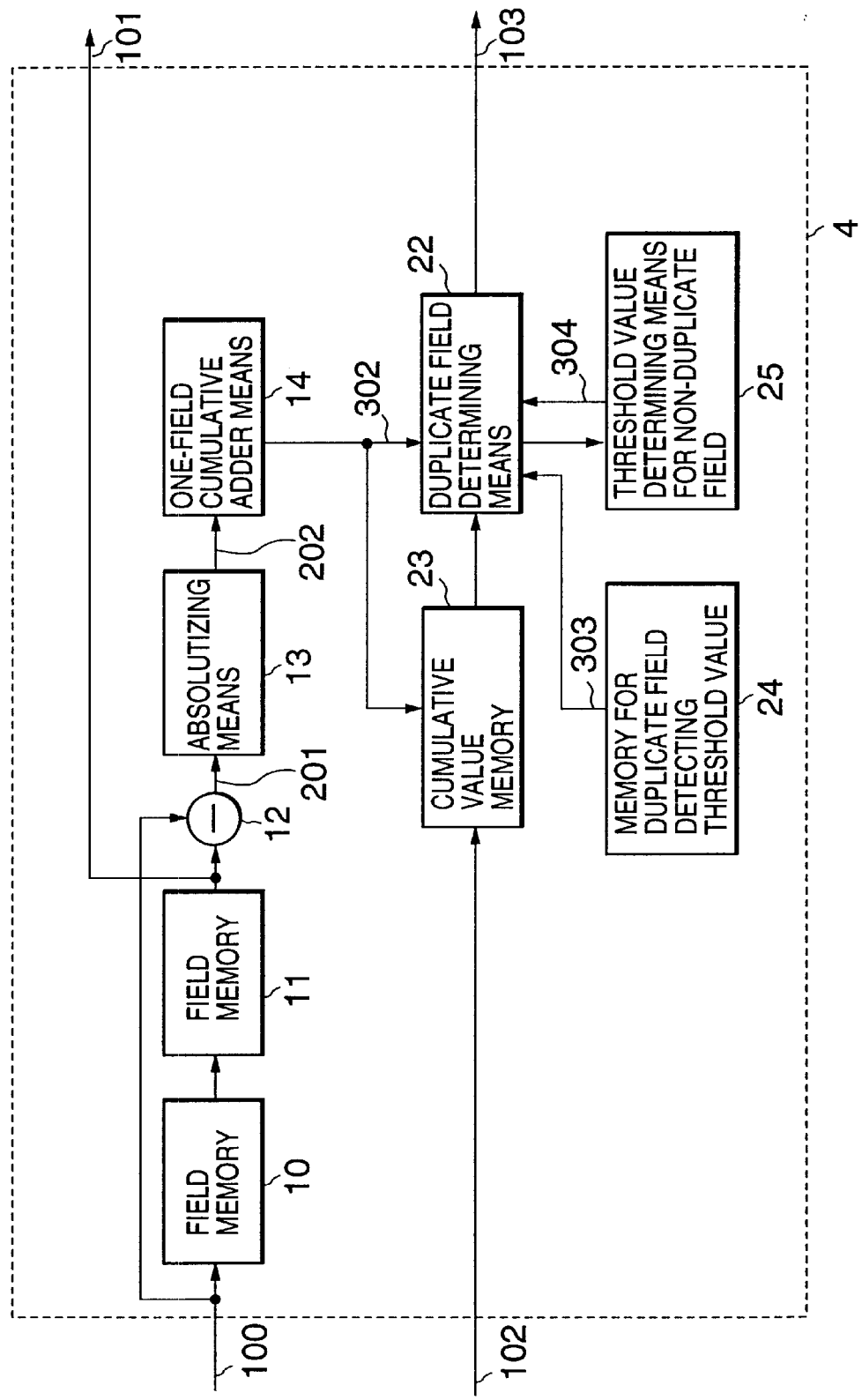
FIG. 2 is a diagram showing a structure of a duplicate field detecting means according to one embodiment of the invention.

FIG. 2 is a diagram showing a structure of a duplicate field detecting means according to one embodiment of the invention. In FIG. 1, the image signal processor comprises a duplicate field detecting means 4 and a duplicate field removing means 5. Further, the duplicate field detecting means 4 shown in FIG. 2 comprises a duplicate field determining means 22, a memory 23 for storing cumulative values of a plurality of fields, a memory 24 for a duplicate field detecting threshold value and a threshold value determining means 25 for a non-duplicate field. The threshold value determining means 25 for non-duplicate field includes a threshold value determining means. The other parts are like or the same as those of the prior art described above. A dynamic random access memory (DRAM) or similar storage device may be used as memories 10, 11, 23, 24, and memory 26, discussed below. The subtracter 12, the absolutize means 13, and the one-field cumulative adder means may be respectively realized by well-known logic circuits. The duplicate field determining means 22 and the threshold value determining means 25 may be realized by an all-purpose micro processor or a digital signal processor with software capable of running the process discussed below. On the other hand, all parts shown in FIG. 1 and FIG. 2 may also be realized by DRAM and an all-purpose micro processor or a digital signal processor with appropriate software.

In FIG. 2, the operations carried out until the absolutizing means 13 outputs the absolute value 202 of the difference signal are the same as those of the prior art. The field memories 10 and 11 store an image signal, for instance a digitized NTSC signal. The subtracter 12 as an example of the subtracting means finds a plurality of differences between luminance signals stored in the field memory 11 and corresponding luminance signals of the image signal 100 respectively. For instance, the subtracter finds the difference between a luminance signal of a pixel at coordinate (X,Y) of a field, which belongs to time t−2, and a luminance signal of a pixel at the same coordinate of the field, which belongs to time t. The luminance signal is a so-called Y signal of the NTSC signal. The absolute value 202 of the difference signal comprises a plurality of absolute values 202 which respectively indicate a difference relating to color (e.g. luminance) of corresponding pixels between the field at time t and the field at time t+2 as mentioned above. The one-field cumulative adder means 14 cumulatively adds the absolute value of the absolute value difference signals 202 for one field and outputs a result of the cumulative addition for one field as a cumulative value 302. The duplicate field determining means 22 compares the cumulative value 302 belonging to time t with a duplicate field detecting threshold value 303 stored in the memory 24. The duplicate field determining means 22 also compares the cumulative values stored in the memory 23 belonging to times t−1 to t−4 with a threshold value for detecting a non-duplicate field 304 determined by the threshold value determining means 25 for a non-duplicate field, and outputs a duplicate field discriminating signal 103 when a duplicate field is detected.

The operation of the duplicate field determining means 22 will be explained below in detail by using a flow chart shown in FIG. 3. The process, carried out by the duplicate field determining means, can be divided roughly into two parts. The first part is Step S30 for deciding whether or not the cumulative value 302 which is directly input to the duplicate field determining means 22 from the one-field cumulative adder means 14, i.e. a cumulative value P(t) of the field presently (at time t) processed, is smaller than a threshold value PLx, stored in the memory 24, for detecting a duplicate field. The other part is Step S40 for deciding whether or not all cumulative values of the past four fields, which are stored in the memory 23, are greater than a threshold value PH for detecting a non-duplicate field determined by the threshold value determining means 25.

The operation in Step S30 will now be explained. First, the cumulative values of four fields in the memory 23 are initialized to 0 in Step S31. Next, it is decided whether or not the cumulative value P(t) is smaller than the threshold value PLx for detecting a duplicate field in Step S32.

When the cumulative value P(t) is not smaller than the threshold value PLx for detecting a duplicate field, i.e. the answer is No in Step S32, it is decided that the field is not a duplicate field. Then, the process advances to Step S33 to turn the duplicate field discriminating signal 103 to OFF and output the duplicate field discriminating signal. Then, the process advances to Step S34 to change t to t=t+1 to process the cumulative value of the next field and to repeat the process of Step S32 again.

When the cumulative value P(t) is smaller than the threshold value PLx for detecting a duplicate field, i.e. the answer is Yes in Step S32, the duplicate field determining means 22 decides that the present field may be a duplicate field and the process is shifted to Step S40.

Figure 4:
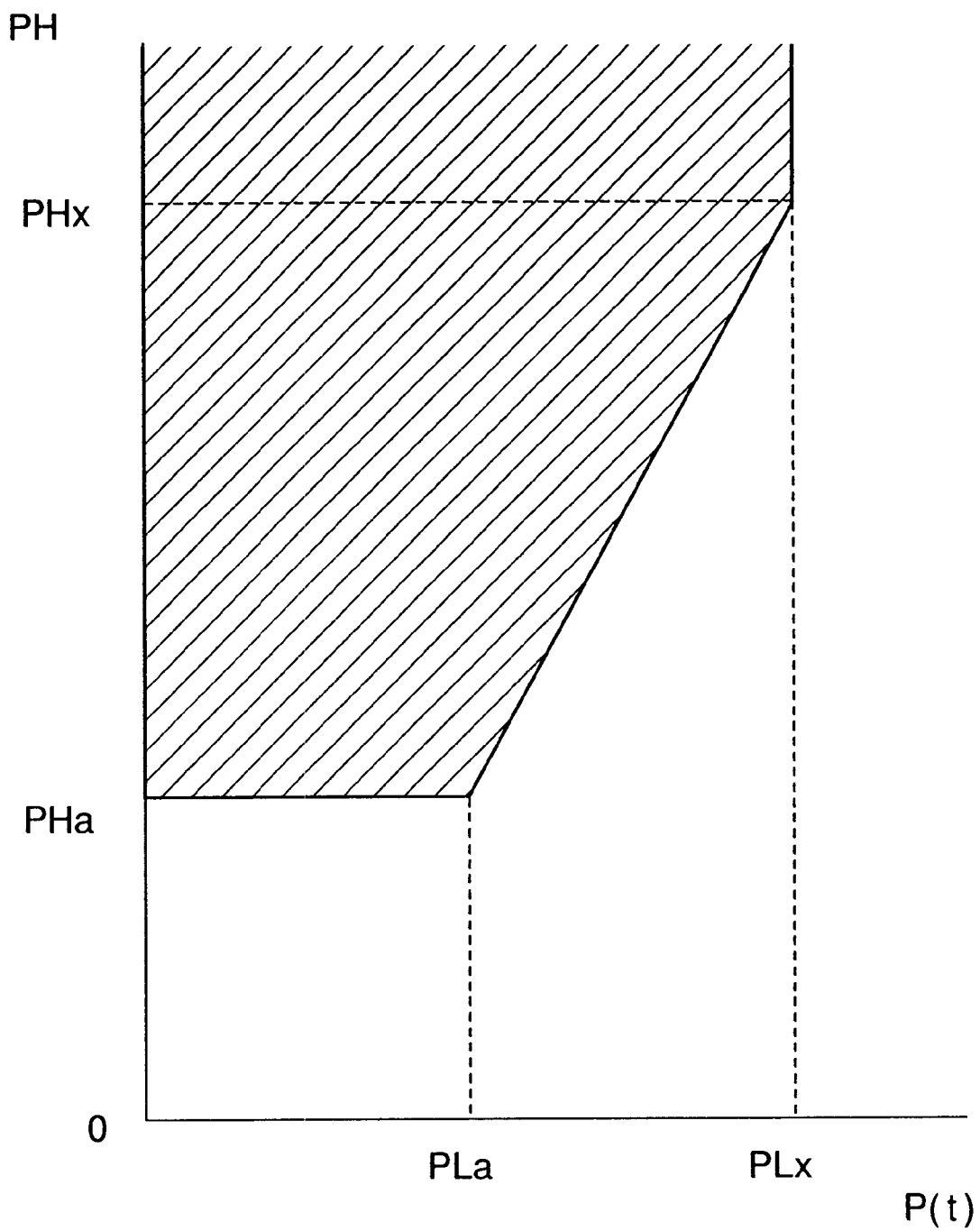
FIG. 4 is an explanatory chart showing an exemplary process for calculating a threshold value for detecting a non-duplicate field.

The operation in Step S40 will now be explained. When the cumulative value P(t) is smaller than the threshold value PLx for detecting a duplicate field, i.e. the answer is Yes in Step S32, the process advances to Step S41 to find the threshold value PH for detecting a non-duplicate field from the cumulative value P(t) through a predetermined calculation and to initialize ti to t−4. The threshold value PH for detecting a non-duplicate field is calculated by using a function as shown in FIG. 4, for example, and by finding a value of PH (vertical axis) corresponding to a value of P(t) (horizontal axis). The function shown in FIG. 4 is also described by following equation.

$$PH = PHa \quad (0 \le P(t) \le PLa) \tag{1}$$

$$PH = \frac{(PHa - PHx)P(t) + PLa \cdot PHx - PLx \cdot PHa}{PLa - PLx}$$

$$(PLa \le P(t) \le PLx)$$

$$PH = \infty \quad (P(t) > PLx)$$

When the luminance signal(Y signal) is expressed with 256 gradation, Parameters of the equation (1) are set to the following values:

$$PLa = 0.4 \cdot N$$

$$PLx = 1.2 \cdot N$$

$$PHa = 0.8 \cdot N$$

$$PHx = 2.4 \cdot N \tag{2}$$

where N is the number of pixels which is used to find the cumulative value. If the duplicate field determining means finds that P(t)=P(t)/(the number of pixels of the absolute value), then N of equation (2) is set as "1".

Then, it is decided whether or not the cumulative value P(ti) stored in the memory 23 is greater than the threshold value PH for detecting a non-duplicate field in Step S42.

When the cumulative value P(ti) stored in the memory 23 is not greater than the threshold value PH for detecting a non-duplicate field, i.e. the answer is No in Step S42, it is decided that the field where the cumulative value P(t) is obtained is not a duplicate field and the duplicate field discriminating signal 103 is output after turning it to OFF in Step S33. Then, t is set to t=t+1 in order to shift to the step for processing the cumulative value of the next field and to repeat the processing steps from Step S32.

When the cumulative value P(ti) stored in the memory 23 is greater than the threshold value PH for detecting a non-duplicate field, i.e. the answer is Yes in Step S42, the process advances to Step S43 to decide whether or not ti is equal to t−1, i.e. whether or not the cumulative value P(ti) stored in the memory 23 has been processed for four fields from t−4 to t−1. When those four fields have not been processed, i.e. the answer is No in Step S43, the process advances to Step S44 to add 1 to ti to repeat the process of decision in Step S42 until those four fields are processed. When ti=t−1 in Step S43, i.e. when four fields of the cumulative values P(ti) stored in the memory 23 from t−4 to t−1 have been processed and all the cumulative values P(ti) are greater than the threshold value PH for detecting a non-duplicate field (i.e. the answer is Yes in Step S43), the duplicate field detecting means 22 decides that the field where the cumulative value P(t) has been obtained is a duplicate field because YES has been returned for all four fields in Step S42. Then, the process advances to Step S45 to output the duplicate field discriminating signal 103 after turning it to ON. Then, the process advances to Step S46 to set t to t=t+1 in order to process the cumulative value of the next field and to repeat the processing steps from Step S32.

As described above, it is decided that the field where the above-mentioned cumulative value 302 has been obtained is a duplicate field when the cumulative value 302 is smaller than the duplicate field detecting threshold value stored in the memory 24 and the cumulative values of the past four fields stored in the memory 23 are all greater than the threshold value for detecting a non-duplicate field in the duplicate field detecting means 4. Further, because all of the past four fields may be determined to correspond to non-duplicate fields, the field where the cumulative value 302 has been obtained is determined to correspond to a duplicate field and the duplicate field discriminating signal 103 is output after turning it to ON. Thereby, the performance for detecting the duplicate field may be enhanced because the threshold values are compared for predetermined several fields by using both the duplicate field detecting threshold value and the threshold value for detecting a non-duplicate field. Further, the duplicate field determining means 22 detects an arrangement of duplicate and non-duplicate fields, e.g. one duplicate field is after four non duplicate fields as described above.

The case described above is when a field is the duplicated field contained in the telecinema signal. There may also be a case when a field has the cumulative value P(t) which is smaller than the threshold value PLx for detecting a duplicate field in an image when motion of the scene is small. A small cumulative value P(t) is always obtained when the motion of the picture is small. Thus, when the cumulative value P(t) is smaller than a predetermined value PLa, the value of PH is set always to PHa as shown in FIG. 4. Thereby, when the cumulative value P(t) is smaller than PLa, the image whose motion is small is rarely erroneously recognized as a duplicate field because a field is not determined to be a duplicate field when the cumulative values of the past four fields stored in the memory 23 are not greater than PHa.

Further, when the signal contains noise there may be a case when the cumulative value P(t) is not smaller than PLa, even though it is a duplicate field. Thus, when the cumulative value P(t) is greater than PLa, a ratio with PH is taken largely, as shown in FIG. 4, with consideration to the influence of noise. Thereby, the signal is rarely erroneously recognized by the influence of noise when the cumulative value P(t) is (smaller than PLx and) greater than PLa because a field is not determined as a duplicate field when the cumulative values of the past four fields stored in the memory 23 are not greater than PH, for which the influence of noise is taken into consideration.

Second Embodiment

Although the absolute value 202 of the difference signal has been found and the absolute value 202 has been output by the absolutizing means 13 in the embodiment described above, the same effect also may be obtained by squaring the difference signal 201 to output a square difference signal and by finding a cumulative added square value of one field by the one-field cumulative adder means 14.

Further, besides the square value of the difference signal 201, a value which permits finding a cumulative value of one field may be used instead of the absolute value 202 of the difference signal 201.

As described above, the same effect of the first embodiment may be obtained by finding a cumulative added square value of one field by implementing the squaring process instead of finding the absolute value of the difference signal 201.

Third Embodiment

Although the case of converting the movie film signal into the NTSC signal has been explained in the above-mentioned embodiment, the present invention is also applicable to other signaling systems which differ in terms of scan lines and frame rates, e.g. a PAL signal of 25 Hz, a color NTSC signal of 29.97 Hz and a High definition television(HDTV, for instance Advanced Television of Advanced Television Systems Committee) signal. For instance, in the case of the PAL signal of 25 Hz, the duplicate field. appears at intervals of one in 25 fields, rather than one duplicate field in five fields. In such a case, it is only necessary to change the initialization equation of "ti=t−4" in Step S41 in FIG. 3 to "ti=t−24".

Further, although the above-mentioned embodiments have been explained by exemplifying the case when the movie film signal of 24 Hz is converted into the NTSC signal, the present invention is also applicable to the case when a movie film signal having another frequency or an image signal of computer graphics, which is not interlace-scanned like the movie film is converted into the NTSC signal. In this case, the expression of initialization of "ti=t−4" in Step S41 in FIG. 3 just needs to change corresponding to each frequency.

Figure 3:
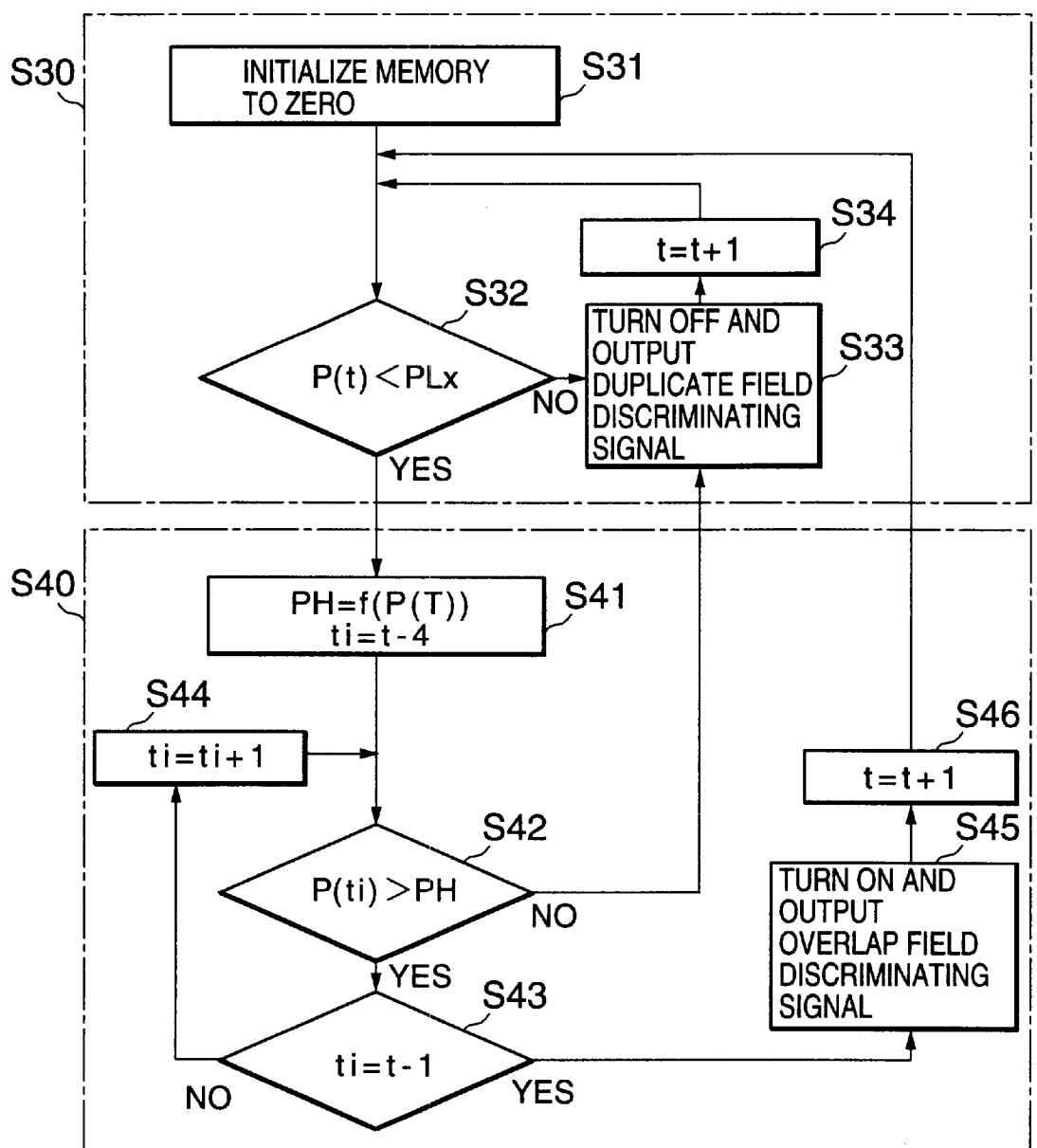
FIG. 3 is a flow chart showing the operation of the duplicate field determining means.

As described above, it is possible to address the case when the frequency or signaling system is different just by changing the expression of initialization of "ti=t−4" in Step S41 in FIG. 3.

Fourth Embodiment

Still further, it is possible to enhance the accuracy of the detection by storing the results of the decision whether or not the input signal is the duplicate field in the embodiments described above.

Figure 5:
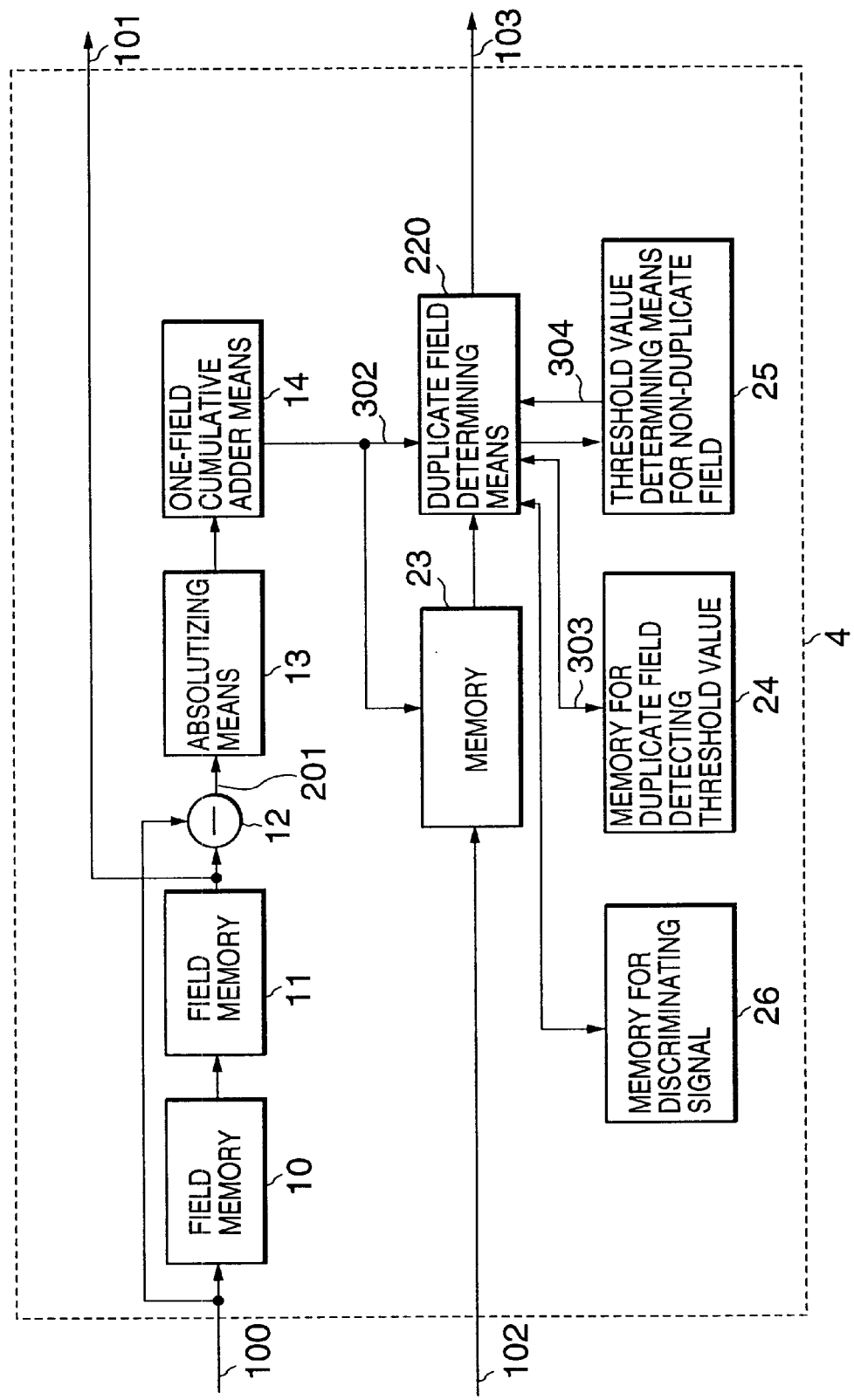
FIG. 5 is a diagram showing a structure of duplicate field detecting means according to one embodiment of the invention.

FIG. 5 is a diagram showing a structure of a duplicate field detecting means according to this embodiment of the invention. The duplicate field detecting means 220 is an improvement of the duplicate field determining means 22 shown in FIG. 2. The operation of the duplicate field determining means 220 will be explained below in detail by using a flow chart shown in FIGS. 6 and 7. A memory 26 has at least 60 regions Sd(1) . . . Sd(tj) . . . Sd(60) . . . of memory, for storing determinations of whether each past field is a duplicate field or not.

Figure 6:
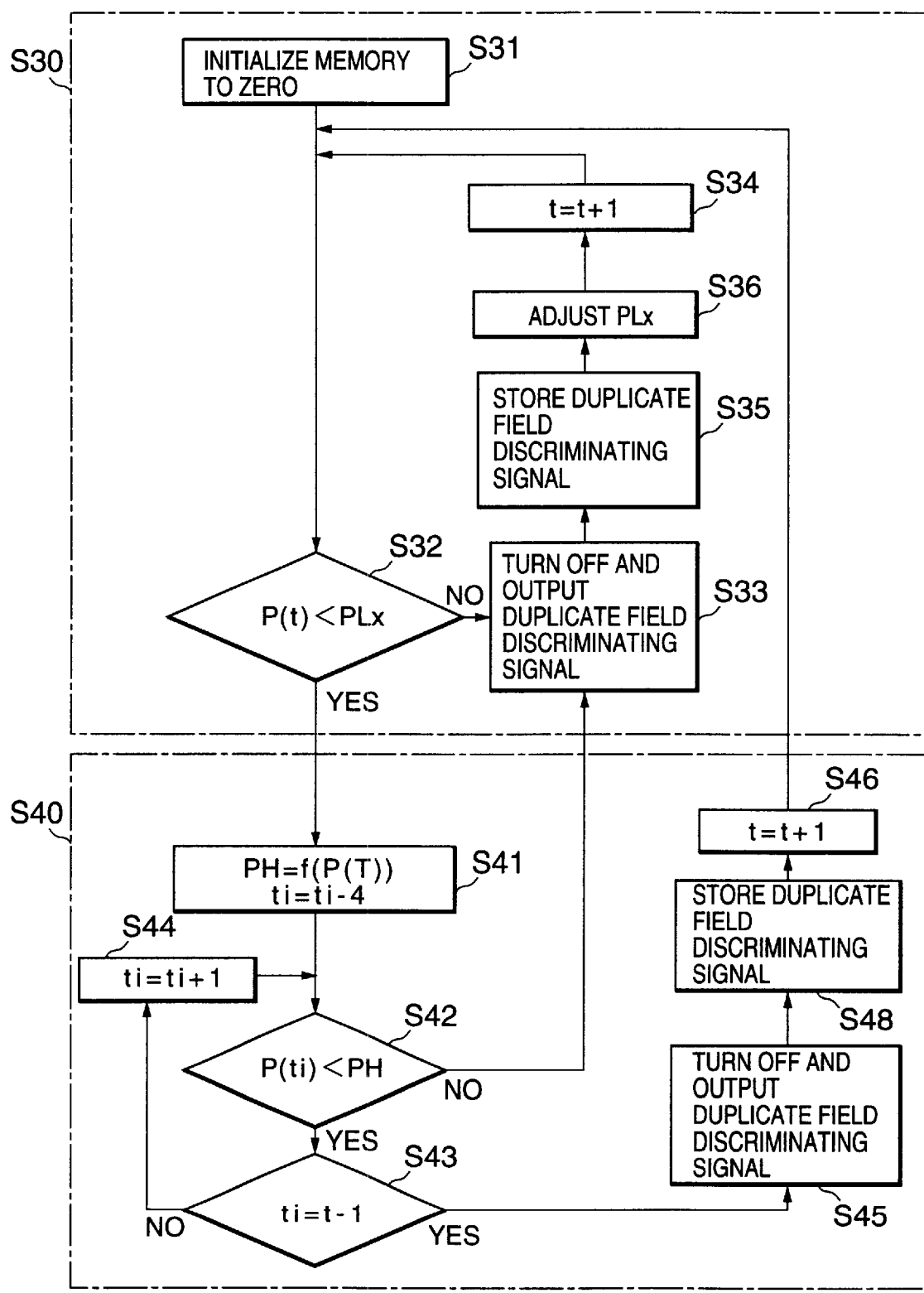
FIG. 6 is a flow chart showing the operation of the duplicate field determining means.

Each step shown in FIG. 6 is the same as the corresponding step shown in FIG. 3 except for Steps S35, S36, and S48. After Step S33, the duplicate field determining means 220 stores the result of the decision, namely the duplicate field discriminating signal 103 which designates "OFF", in the memory 26 in Step S35. For instance "OFF" is expressed as "0" and "ON" is expressed as "1" in the memory 26. The duplicate field determining means 220 likewise stores the duplicate field discriminating signal 103 as "ON", namely "1", in memory 26 in Step S48 between Step S45 and S46. The duplicate field discriminating signal is stored in an address of memory 26 in accordance with time t.

After the duplicate field determining means 220 has finished Step S35, the duplicate field determining means 220 adjusts the threshold value for detecting a duplicate field, which is stored in memory 24, based on the result of detecting a duplicate fields of a past time in Step S36.

The duplicate fields should appear regularly per every 5 field-time when the 3:2 pull-down process is implemented. Because it may be assumed that no non-duplicate field is erroneously determined to be a duplicate field when the duplicate fields appear regularly per every 5 field-time in the stored result of decision, the threshold value PLx for detecting a duplicate field is set at a larger value so that the duplicate fields can be discriminated more reliably. In contrary to that, because it may be assumed that a non-duplicate field is erroneously determined to be a duplicate field when the duplicate fields do not appear regularly per every 5 field-time in the stored result of decision, the threshold value PLx for detecting duplicate field is set at a smaller value so that number of non-duplicate fields which are erroneously determined to be a duplicate field decreases.

Figure 7:
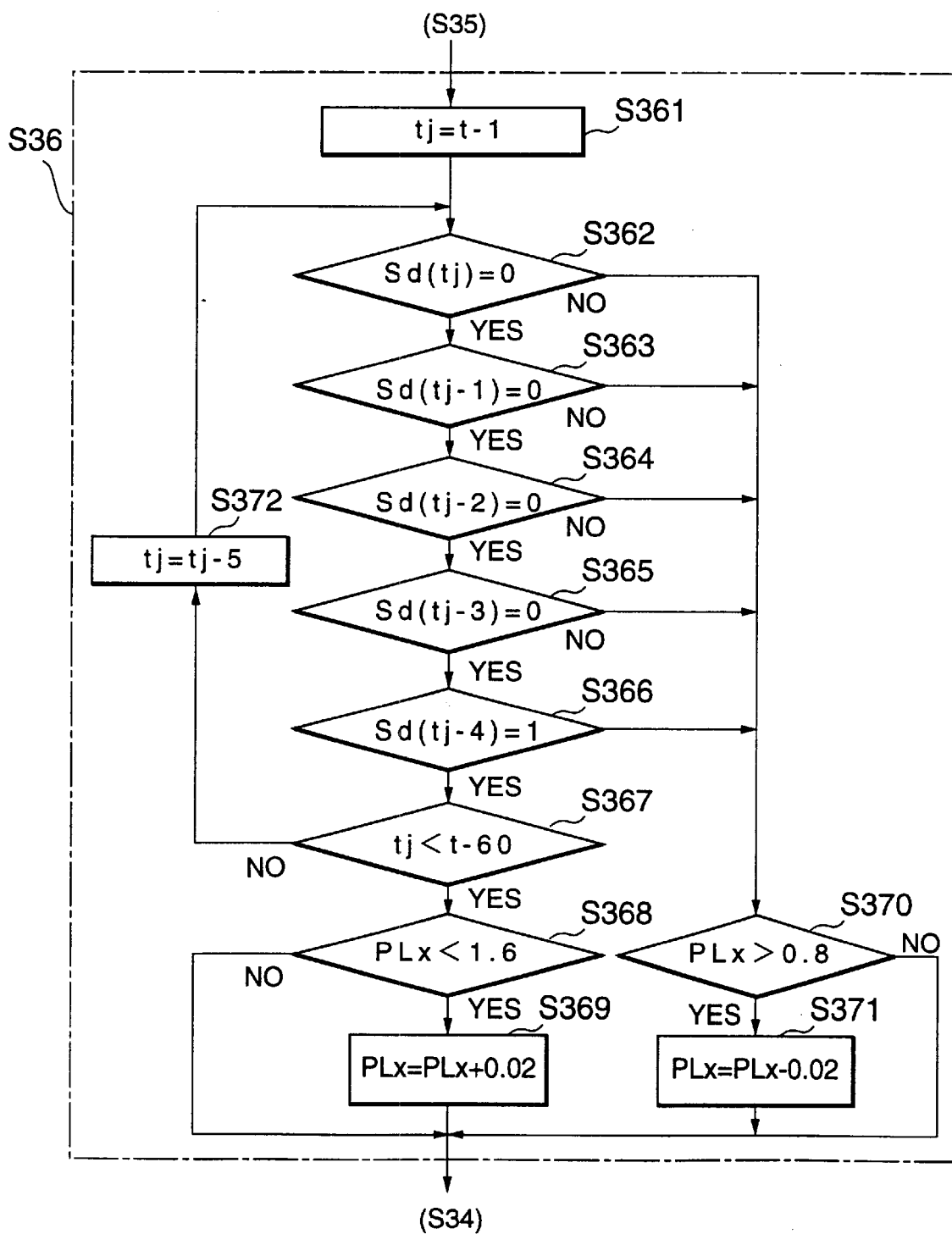
FIG. 7 is a flow chart showing the operation of the duplicate field determining means.

For instance, FIG. 7 shows a flowchart of Step S36 in detail. After Step S35, the duplicate field determining means 220 initializes a counter tj to 0 in Step S361.

Then, the duplicate field determining means 220 checks whether the past four fields at time tj . . . (tj−4) are non-duplicate fields or not, namely whether each value Sd(tj) . . . Sd(tj−3)=0 or not, by accessing the memory 26 in Step S362 . . . S365. If one of Sd(tj) . . . Sd(tj−3) is not a non-duplicate field, then the process advances to Step S370. While if all of Sd(tj) . . . Sd(tj−3) are 0 then the duplicate field determining means 220 checks whether a field Sd(tj−4) of four fields before is a duplicate field or not. If the field Sd(tj−4) is not a duplicate field, then the process advances to Step S370. If the field Sd(tj−4) is a duplicate field, namely Sd(tj−4)=1, then the duplicate field determining means 220 checks whether or not the past 60 fields have been checked, namely whether tj is smaller than (t−60) or not, in Step S367. If tj is smaller than (t−60), then the duplicate field determining means 220 subtracts 5 from tj in Step S367 and the process returns to Step S362.

If tj is not smaller than (t−60), then the duplicate field determining means 220 checks whether the threshold value for detecting a duplicate field PLx is smaller than a predetermined maximum value, for instance 1.6, in Step S368. If PLx is smaller than the predetermined maximum value, then the duplicate field determining means 220 adds a predetermined value to PLx, e.g. PLx=PLx+0.02, and stores the adjusted PLx in the memory 24. Then the process advances to Step S34 in FIG. 6. If PLx is not smaller than the predetermined maximum value then the process advances to Step S34 in FIG. 6 without adjusting PLx.

On the other hand, if an irregularity is detected, namely a "No", the duplicate field determining means 220 checks whether PLx is greater than a predetermined minimum value, e.g. 0.8, or not. If PLX is greater than a predetermined minimum value, then the duplicate field determining means 220 subtracts a predetermined value from PLx, e.g. PLx=PLx−0.02, and stores the adjusted PLx in the memory 24. Then the process advances to Step S34 in FIG. 6. If PLx is not greater than the predetermined minimum value then the process advances to Step S34 in FIG. 6 without adjusting PLx.

As described above, it is possible to enhance the accuracy of the detection by comparing the regularity at which the duplicate fields appear, and by controlling the threshold value PLx for detecting a duplicate field based on the result of comparison. The regularity obtained by checking the periodicity of appearances of duplicate fields among the non-duplicate fields or by measuring the time when a signal is determined to be a duplicate field and a time when a signal is decided to be a non-duplicate field.

It is noted that although the case in which one duplicate field exists within five fields has been explained in the present embodiment, it is possible to enhance the accuracy of the detection in the same manner even when the frequency and signaling system are different and the regularity at which the duplicate fields appear is different.

Fifth Embodiment

Figure 8:
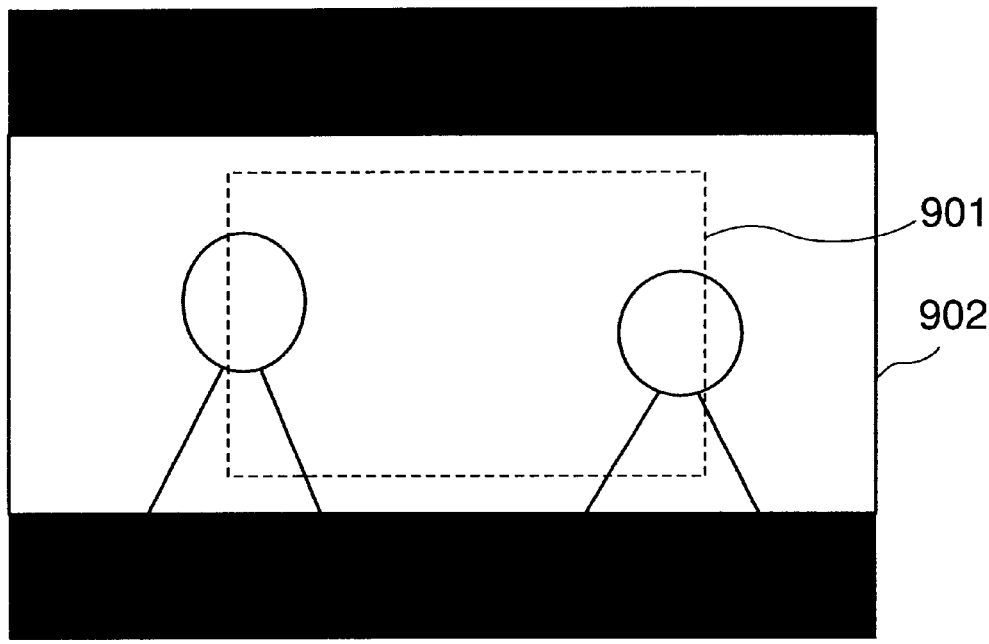
FIG. 8 is an explanatory drawing showing an exemplary process implemented on a trimmed image.

In the above-mentioned embodiments, the cumulative addition of one field is implemented by the one-field cumulative adder means 14. In the case where a motion picture signal is converted to an NTSC signal, a trimming process of inserting black bands is often implemented because the aspect ratio of the screen is normally different and there is no image signal at the upper and lower parts of the screen as shown in FIG. 8. Because the differential value is always zero in the black band parts, the cumulative value of one field becomes small, leading to the possibility of erroneously detecting a duplicate field of the telecinema signal, when the cumulative addition is implemented on the whole screen. Thus, the accuracy of the detection of the duplicate field of the telecinema signal may be enhanced by implementing the cumulative addition by using only the center part of the screen where the image signal changes and by avoiding the black band parts in the subtracter 13.

In this case, it is possible to process only the center part of the screen like a part within a frame 901 in FIG. 8. It is also possible to process a part within a frame 902 from which the black band parts are removed by measuring an area where pixel values assume more than a predetermined threshold value with respect to the input image signal across a plurality of frames.

Further, it is possible to process a screen in which images of a plurality of frame rates are mixed within the screen by the same method.

Figure 9:
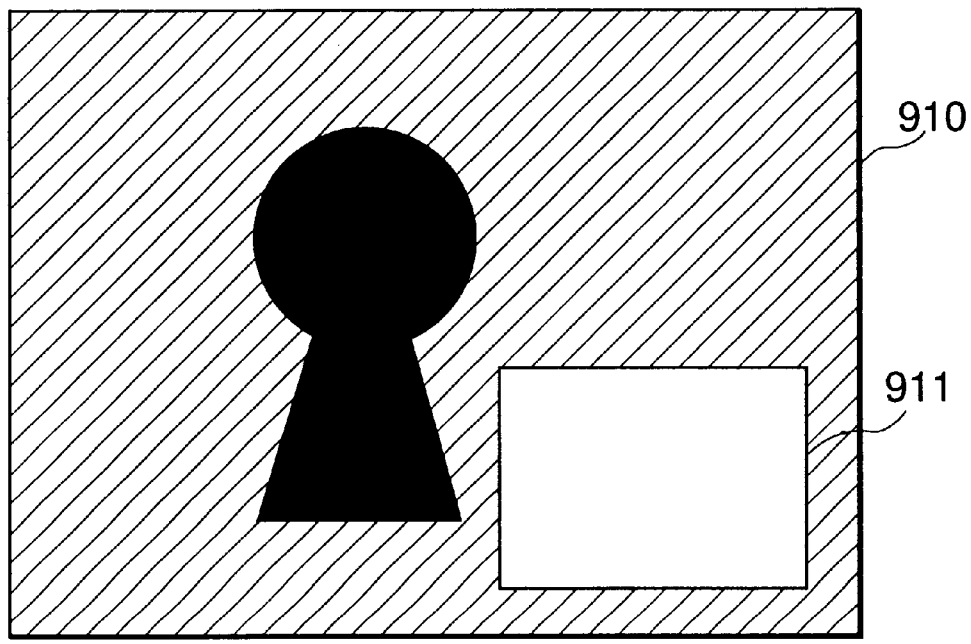
FIG. 9 is an explanatory drawing showing an exemplary process on an image to which a picture-in-picture process has been implemented.

For instance, when a picture-in-picture process by which a small screen 911 is superimposed within a screen 910 as shown in FIG. 9 is implemented, the NTSC signal is displayed on the background of the screen 910 and the image signal of 30 Hz is displayed on the small screen 911. At this time, a duplicate field of the telecinema signal may be detected by implementing the cumulative addition by using only the background part of the screen 910. In this case, only part of the area within the screen may be decided as the duplicate field by dividing the screen into a plurality of sub-blocks and by implementing the cumulative addition and duplicate field determining process in units of sub-blocks, as opposed to implementing the cumulative addition process to the whole field like the above-mentioned embodiments. The result of the decision of the sub-blocks may be utilized in dividing the area of the screen.

As described above, the accuracy of the detection of duplicate fields may be enhanced even when the trimming process or the picture-in-picture process has been implemented by processing a partial area of the screen.

Sixth Embodiment

Figure 10:
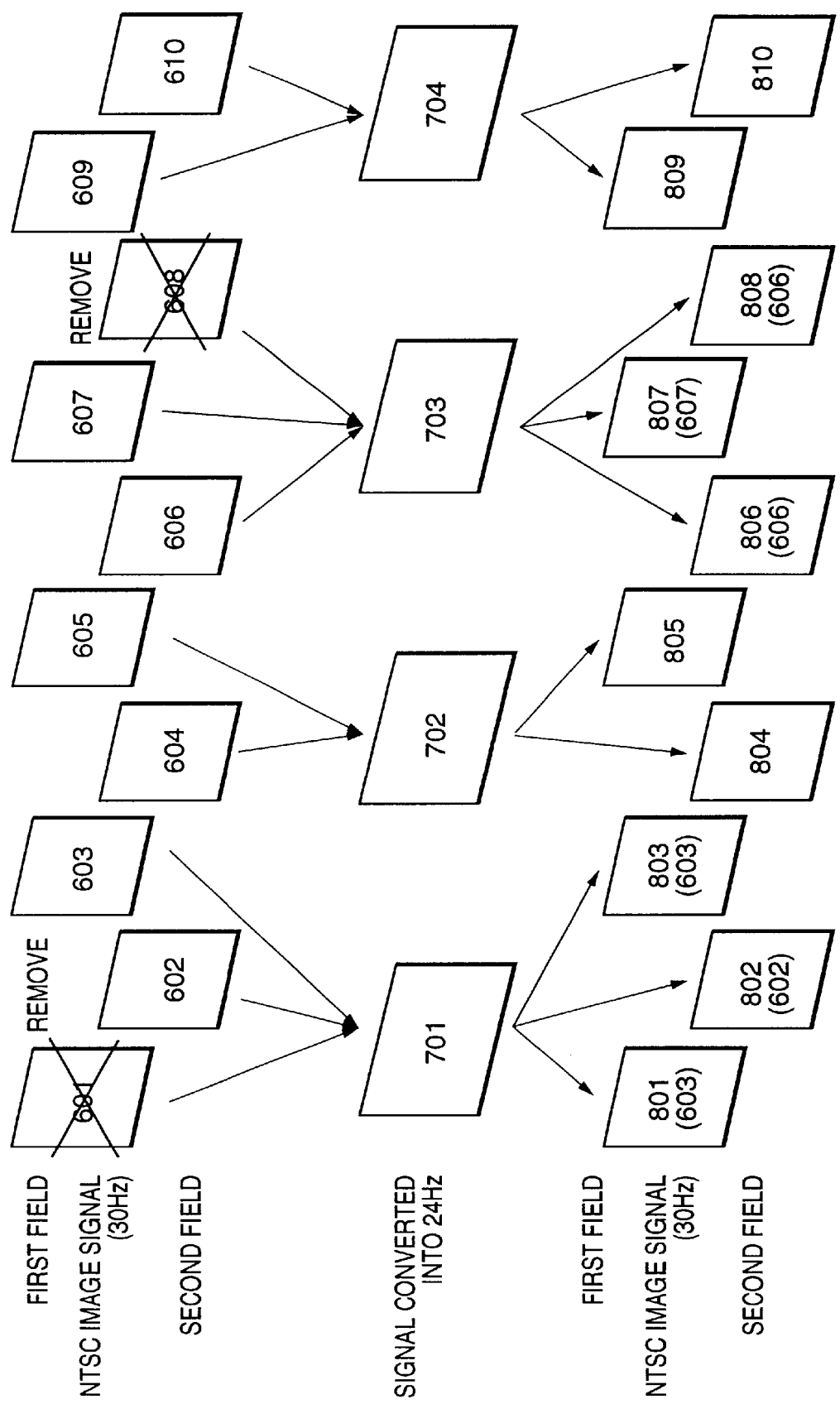
FIG. 10 is an explanatory diagram showing an example in which image disturbance caused by recognition error when an NTSC signal is erroneously recognized as a telecinema signal is reduced.
Figure 11:
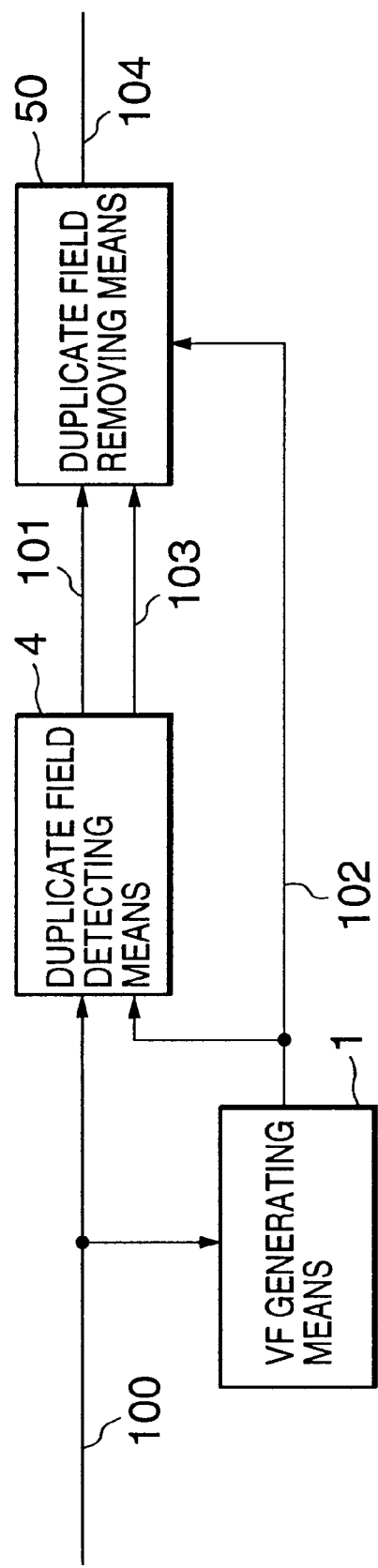
FIG. 11 is a diagram showing a structure of an image signal processor according to one embodiment of the present invention.

Next, the operation of a duplicate field removing means 50 which allows an image having less visual disturbance, especially playing with slow motion or still motion, to be reproduced even when the NTSC signal is erroneously recognized as the telecinema signal will be explained with reference to FIG. 10. In FIG. 11, the duplicate field removing means 50 is similar to the duplicate field removing means 5 shown in FIG. 1 except for the method of removing. The method of removing will be explained with reference to the flow chart shown in FIG. 12.

The duplicate field removing means 50 receives the VF signal 102 together with the image signal 101 and the duplicate field discriminating signal 103.

When the duplicate field discriminating signal 103 is ON, the duplicate field removing means 50 checks whether a duplicate field belongs to the first field or the second field by using the VF signal 102. When a field detected as a duplicate field belongs to the first field, the duplicate field removing means 50 removes the field previously input. For instance, when a signal in Fields 601 through 610 in FIG. 10 is erroneously recognized as a telecinema signal, even though it is a NTSC signal, and signals of Field 601 and Field 603 of the first field are recognized as duplicating even though they are different signals (NTSC signal), the previously input Field 601 is removed. Then, a signal 701 converted into 24 Hz is formed from the two fields of Field 602 and Field 603 and is output. As a result, the same signal of Field 603 is displayed in Fields 801 and 803 and the same signal of Field 602 is displayed in Field 802. Thereby, a time difference between the first field (Field 801) and the second field (Field 802) within the same frame turns out to be ⅙₀ second which is equal to the time difference between Field 603 and Field 602. When Field 603 which is input later is removed, a time difference of ⅗₀ seconds is produced as described in connection with the prior art. Accordingly, the apparatus of this embodiment allows an image having less visual disturbance to be reproduced as compared to the prior art method.

When a field detected as a duplicate field belongs to the second field on the other hand, the field input later is removed. For instance, when Fields 606 and 608 are recognized as duplicating even though they are different signals (NTSC signal) in FIG. 10, Field 608 input later is removed. Then, a signal 703 converted into 24 Hz is formed from the two fields of Fields 606 and 607 and is output. As a result, the same signal of Field 606 is displayed in Fields 806 and 808 and the same signal of Field 607 is displayed in Field 807. Thereby, a time difference between the first field (Field 807) and the second field (Field 808) within the same frame turns out to be ⅙₀ second which is equal to the time difference between Field 607 and Field 606. When Field 606 which is previously input is removed, a time difference of ⅗₀ seconds is produced in the same manner with the above-mentioned case. Accordingly, the image processor of this embodiment allows an image having less visual disturbance to be reproduced as compared to the prior art method.

Figure 12:
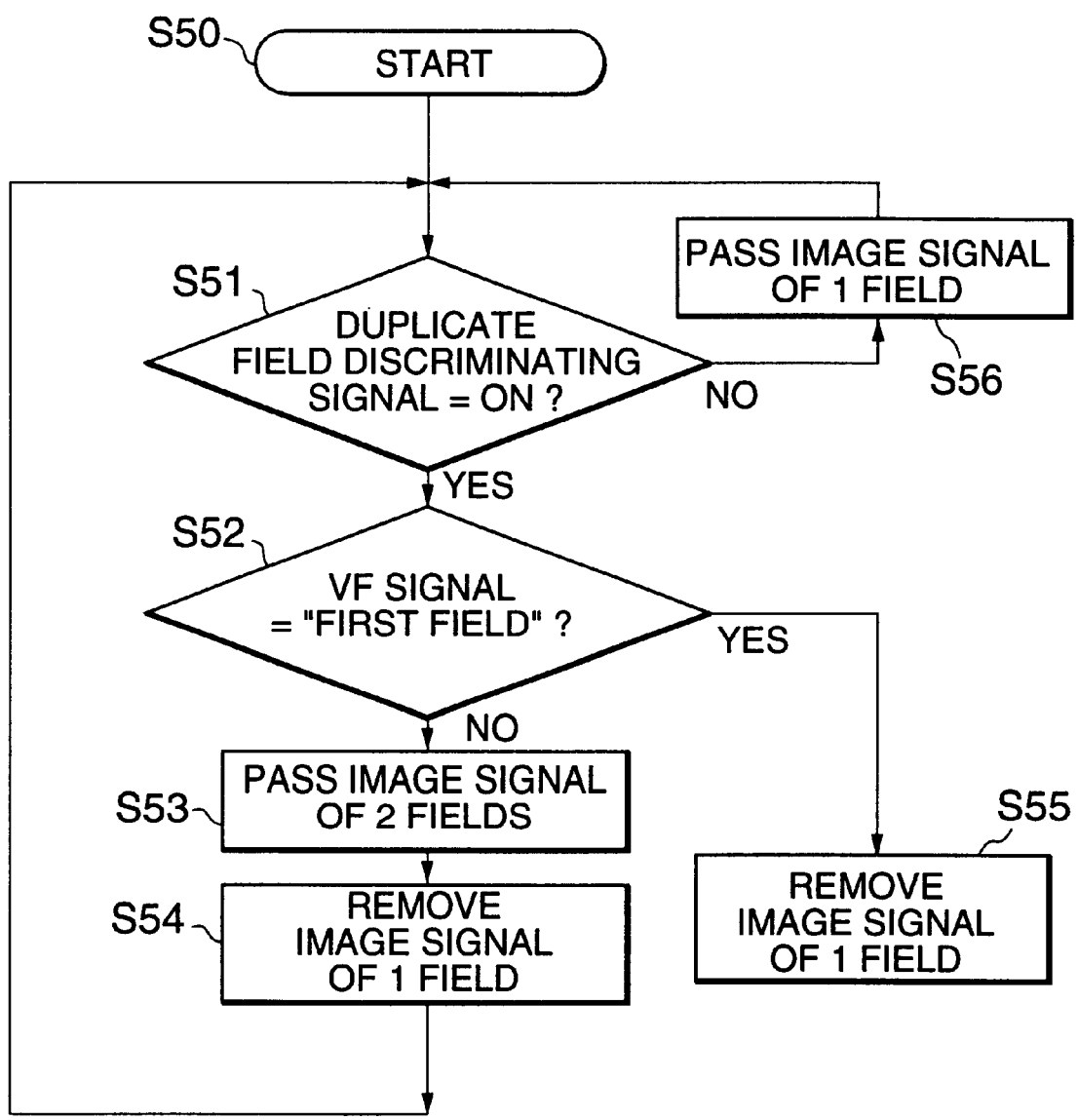
FIG. 12 is a flow chart showing the operation of the duplicate field removing means.
Figure 13:
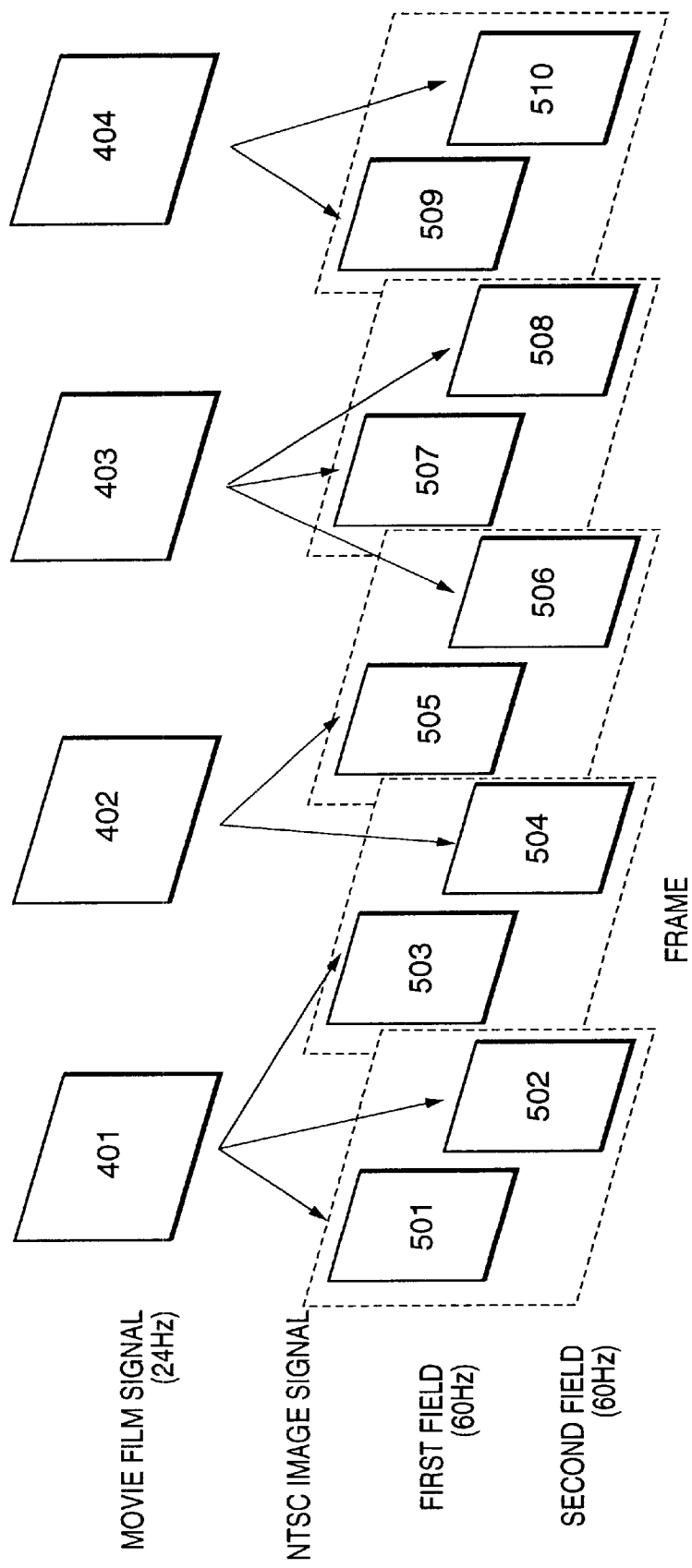
FIG. 13 is an explanatory diagram showing the principle of 3-2 pull-down.
Figure 14:
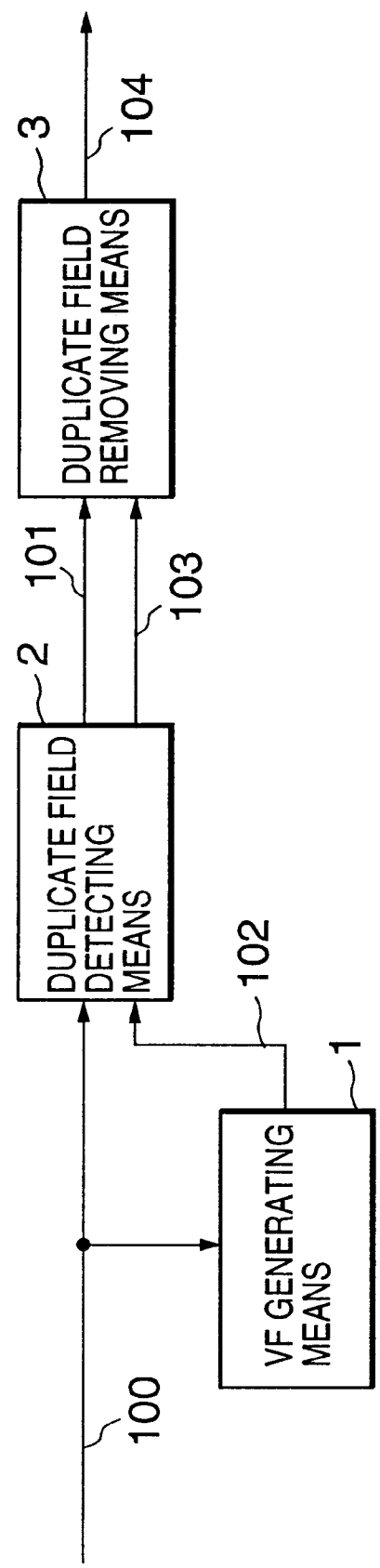
FIG. 14 is a diagram showing a structure of a prior art image signal processor.
Figure 15:
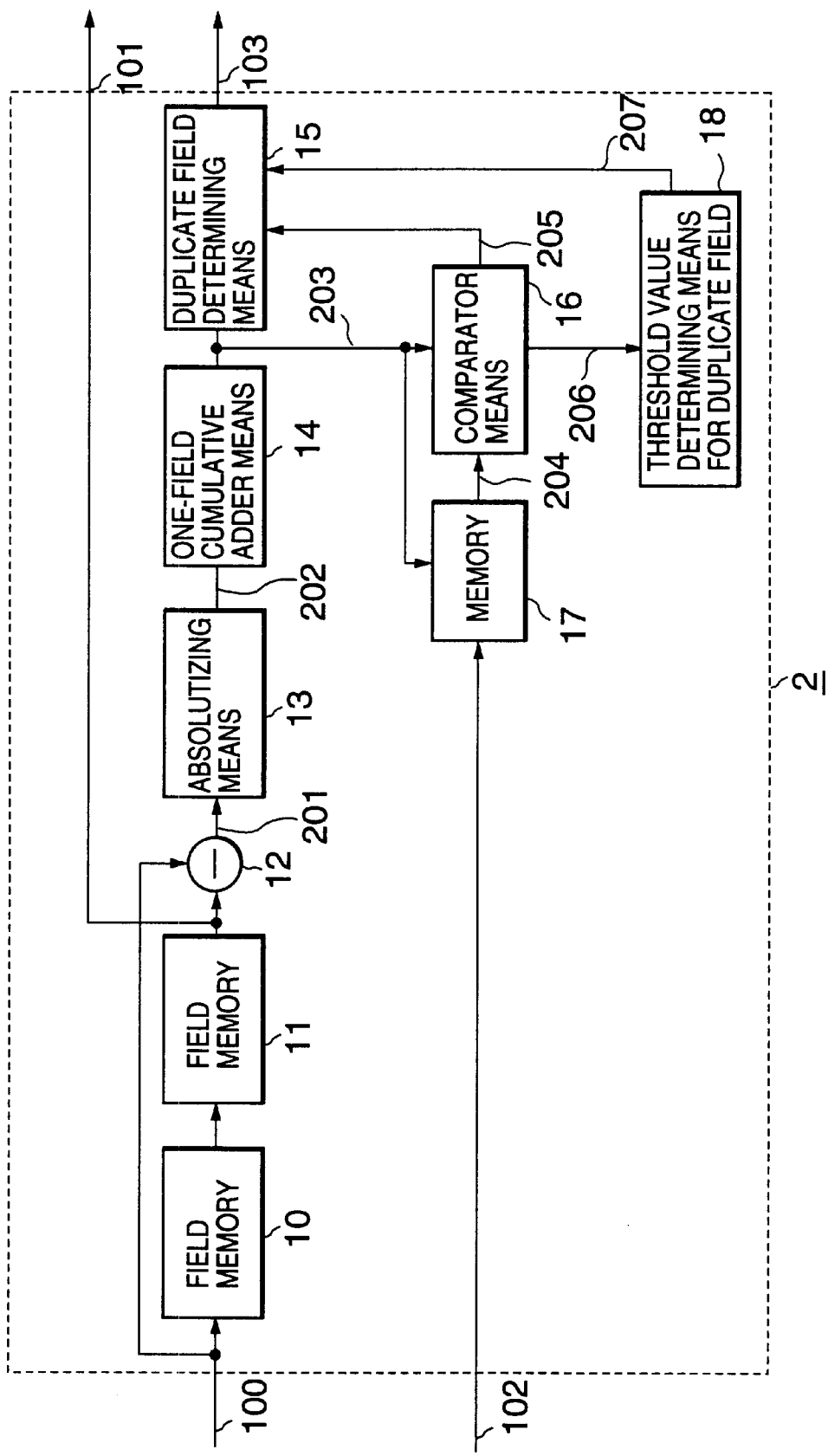
FIG. 15 is a diagram showing a structure of a prior art duplicate field detecting means.
Figure 16:
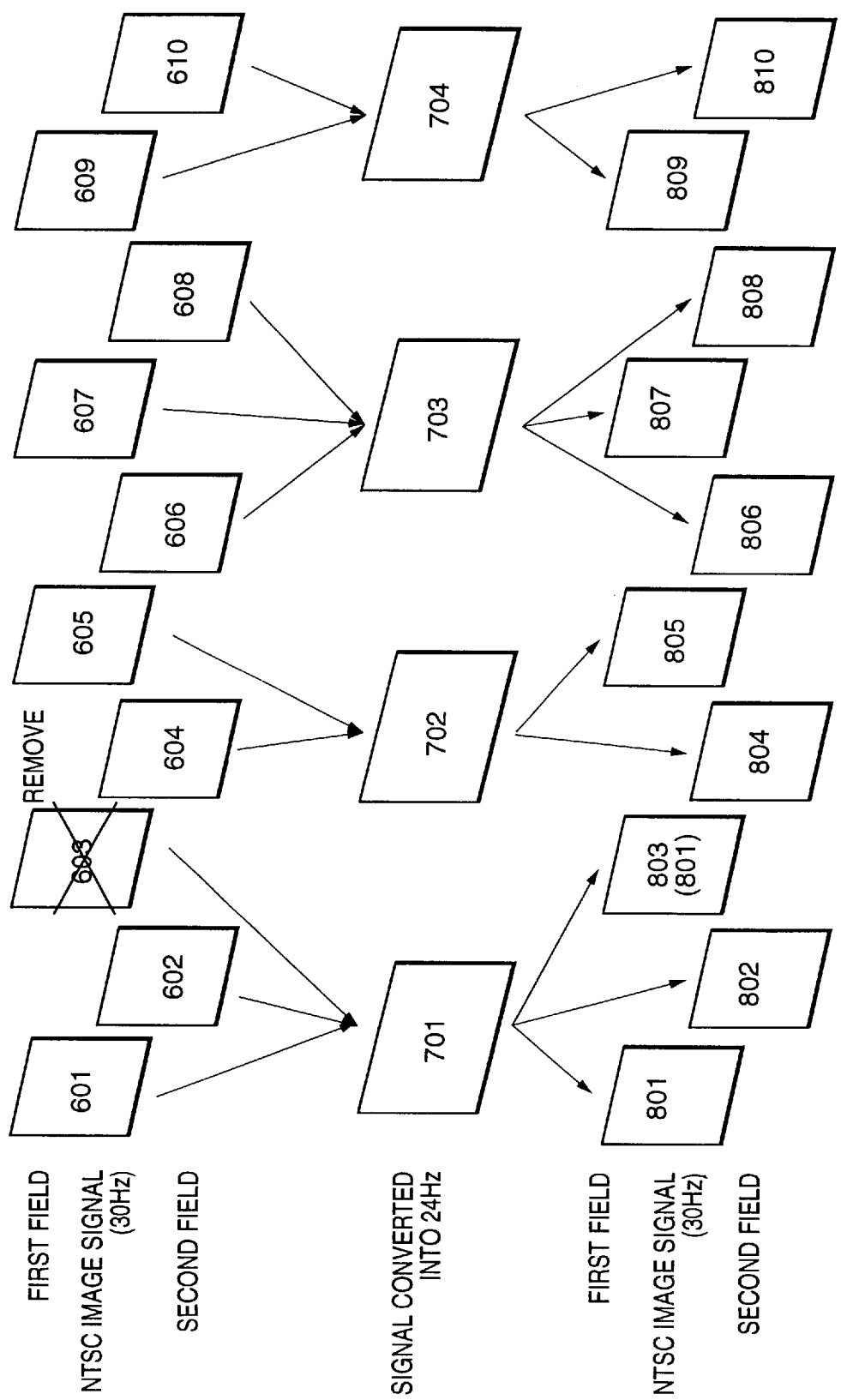
FIG. 16 is an explanatory diagram showing an example in which image disturbance caused by recognition error when an NTSC signal is erroneously recognized as a telecinema signal is reduced.

FIG. 12 shows the operations of a duplicate field removing means 50. The duplicate field removing means 50 checks whether or not the duplicate field discriminating signal 103 indicates ON or not in Step S51. If the duplicate discriminating signal 103 does not indicate ON, then the duplicate field removing means 50 outputs the image signal 101 as the image signal 104 without removing in Step 56. Then the process returns to Step S51.

If the duplicate discriminating signal 103 indicates ON, then the duplicate field removing means 50 checks whether the VF signal 102 indicates that the image signal 101 belongs to the first field or not in Step S52. If the VF signal 102 indicates a first field, then the duplicate field removing means 50 removes the present input image signal 101 of one field without output in Step 55. The removed image signal occurs at time t−2. Then the process returns to Step S51.

If the VF signal 102 does not indicate a first field, then the duplicate removing means 50 outputs the input image signal 101 of two fields at time t−2 and t−1, namely input image signal of the present input and next fields, as the image signal 104 in Step S53. Then the duplicate field removing means 50 removes a duplicate field at time t detected by the duplicate field removing means. Then the process returns to Step S51.

As described above, the image having less visual disturbance may be reproduced even when the NTSC signal is erroneously recognized as the telecinema signal by removing the field precedently positioned temporally when a field detected as being a duplicate field belongs to the first field and by removing the field positioned behind temporally when the field belongs to the second field.

It is noted that the present invention allows the processing amount of the subtracter 12, the absolutizing means 13 and the one-field cumulative adder means 14 to be reduced by an arrangement in which the processes on and after the subtracter 12 are implemented after sub-sampling sampling one pixel to four pixels or one pixel to 16 pixels, rather than processing all the pixels of the image signal of the whole or part of the screen as described above.

While the preferred embodiments have been described, variations thereto will occur to those skilled in the art within the scope of the present inventive concepts which are delineated by the following claims.

What is claimed is:

1. An image signal processor, comprising:
   a duplicate field detecting means for detecting a duplicate field of an image signal, said duplicate field detecting means determining whether a current field is a duplicate field by comparing a cumulative value of the current field with a first threshold value for detecting a duplicate field, comparing said cumulative value for said current field of said image signal with said first threshold value and detecting said current field as a non-duplicate field when the cumulative value for said current field is greater than said first threshold value and comparing a cumulative value of each of a plurality of fields preceding said current field with a second threshold value for detecting a non-duplicate field different from said first threshold value; and
   a duplicate field removing means for removing said duplicate field detected by said duplicate field detecting means.

2. The image signal processor according to claim 1, wherein said duplicate field detecting means comprises:
   a subtracting means for obtaining a plurality of field differential values by comparing a plurality of first fields of said image signal and comparing a plurality of second fields of said image signal; and
   a duplicate field determining means for determining duplicate fields according to a pattern of appearance of duplicate and non-duplicate fields.

3. The image signal processor according to claim 2, wherein said duplicate field detecting means adjusts said threshold value for detecting a duplicate field based on a periodicity of said duplicate fields detected by said duplicate field determining means.

4. The image signal processor according to claim 3, further comprising:
   a memory for storing a plurality of results of detection made by said duplicate field determining means,
   wherein said duplicate field determining means decreases said threshold value for detecting a duplicate field when a pattern of appearance of duplicate and non-duplicate fields does not correspond with a predetermined pattern of appearance of duplicate and non-duplicate fields.

5. The image signal processor according to claim 4, wherein said duplicate field determining means increases said threshold value for detecting a duplicate field when a pattern of appearance of duplicate and non-duplicate fields corresponds with said predetermined pattern.

6. The image signal processor according to claim 2, wherein said duplicate field detecting means further comprises:
   an absolutizing means for obtaining a plurality of absolute values by absolutizing said field differential values; and
   a one-field cumulative adder means for obtaining a plurality of cumulative values by accumulating said absolute values, wherein each of said cumulative values relates to one of said first fields and said second fields, wherein
   said duplicate field determining means determines said duplicate field by comparing one of said cumulative values, which is said cumulative value of the current field, with said first threshold value for detecting a duplicate field and comparing the other cumulative values, which are cumulative values for said plurality of fields preceding said current field, with said second threshold value for detecting a non-duplicate field respectively.

7. The image signal processor according to claim 6, wherein said duplicate field detecting means further comprises:
   a threshold value determining means for determining said second threshold value for detecting a non-duplicate field based on said one of said cumulative values.

8. The image signal processor according to claim 7, wherein said threshold value determining means determines said second threshold value for detecting a duplicate field such that said second threshold value is in direct said second fields.

9. The image signal processor according to claim 6, wherein
   said duplicate field determining means determines that said current field is a duplicate field when the cumulative value of each of said plurality of fields is greater than said second threshold value for detecting a non-duplicate field, the cumulative values of said plurality of fields relating to a predetermined number of fields which adjacently antecede said current field, said predetermined number being determined based on a field rate of a movie film and a field rate of said image signal.

10. The image signal processor according to claim 9, wherein said image signal is telecinema signal of 30 Hz produced from a movie film of 24 Hz, and said duplicate field determining means further comprises:
    a memory for storing said cumulative values;
    a means for determining that said current field is potentially a duplicate field by detecting that the cumulative value of said current field is smaller than said first threshold value for detecting a duplicate field; and
    a means for detecting that said potentially duplicate field is a duplicate field by detecting that four consecutive cumulative values are greater than said second threshold value for detecting a non-duplicate field, wherein said four consecutive cumulative values are for fields adjacent to said potentially duplicate field.

11. The image signal processor according to claim 2, wherein said duplicate field detecting means detects duplicate fields based on said image signal relating to partial data of a first field.

12. The image signal processor according to claim 2, said duplicate field detecting means further comprising:
    a field memory storing two fields of said image signal and outputting said image signal to said subtracting means;
    an absolutizing means for obtaining a plurality of absolute values by absolutizing said field differential values obtained by said subtracting means;
    a one-field cumulative adder means for obtaining a plurality of cumulative values by accumulating absolute values, wherein each of said cumulative values relates to one of said first fields and said second fields;
    a cumulative value memory for storing said cumulative values;
    a threshold value memory storing said threshold value for detecting a duplicate field; and
    a threshold value determining means for determining said threshold value for detecting a non-duplicate field based on one of said cumulative values, wherein said duplicate field determining means is operatively connected to said one-field cumulative adder means, said cumulative value memory, said threshold value memory, and said threshold value determining means, and determines said duplicate field by checking said pattern of appearance of duplicate and non-duplicate fields based on said first threshold value for detecting a duplicate field, said second threshold value for detecting a non-duplicate field, and said plurality of field differential values.

13. The image signal processor according to claim 2, wherein said duplicate field removing means removes one of said plurality of first fields which temporally antecedes and corresponds to a duplicate field detected by said duplicate field detecting means when said detected duplicate field corresponds to said plurality of first fields, and removes said detected duplicate field when said detected duplicate field corresponds to said plurality of second fields.

14. An image signal processor, comprising:
   a logic circuit that outputs a series of cumulative values, each cumulative value representing a difference between temporally offset fields of an image signal; and
   a microprocessor that detects whether a current field is a duplicate field by
      (i) comparing a cumulative value for said current field and a threshold value for detecting a duplicate field, and
      (ii) comparing said cumulative value for said current field of said image signal with said first threshold value and detecting said current field as a non-duplicate field when the cumulative value for said current field is greater than said first threshold value and comparing a cumulative value for each of a plurality of fields that immediately precede said current field and a second threshold value for detecting a non-duplicate field when said cumulative value for said current field is less than said first threshold value.

15. The image signal processor according to claim 14, wherein each cumulative value represents a cumulative added absolute value of the difference between temporally offset fields.

16. The image signal processor according to claim 14, wherein said microprocessor determines duplicate fields based on periodic appearance of duplicate fields.

17. The image signal processor according to claim 14, wherein said threshold value for detecting a non-duplicate field is based on the cumulative value for said current field when the cumulative value for said current field is lower than said threshold value for detecting a duplicate field.

18. An image signal processing method, comprising:
   outputting a series of cumulative values, each cumulative value representing a difference between temporally offset fields of an image signal; and
   detecting whether a current field is a duplicate field by
      (i) comparing a cumulative value for said current field and a threshold value for detecting a duplicate field, and
      (ii) comparing said cumulative value for said current field of said image signal with said first threshold value and detecting said current field as a non-duplicate field when the cumulative value for said current field is greater than said first threshold value and comparing a cumulative value for each of a plurality of fields that immediately precede said current field and a second threshold value for detecting a non-duplicate field when said cumulative value for said current field is less than said first threshold value.

19. The image signal processing method according to claim 18, wherein said outputting step includes calculating each cumulative value by cumulatively adding absolute values of the difference between temporally offset fields.

20. The image signal processing method according to claim 18, further comprising:
   determining duplicate fields based on periodic appearance of duplicate fields.

21. The image signal processor comprising:
   a duplicate field detecting means for detecting a duplicate field of an image signal, said duplicate field detecting means determining whether a current field is a duplicate field by comparing a cumulative value of the current field with a first threshold value for detecting a duplicate field, and comparing a cumulative value of each of a plurality of fields preceding said current field with a second threshold value for detecting a non-duplicate field different from said first threshold value; and
   a duplicate field removing means for removing said duplicate field detected by said duplicate field detecting means, wherein said duplicate field detecting means performs the functions of:
      comparing said cumulative value for said current field of said image signal with said first threshold value and detecting said current field as a non-duplicate field when the cumulative value for said current field is greater than said first threshold value; and
      comparing said cumulative value for each of the plurality of fields preceding said current field with said second threshold when said cumulative value for said current field is less than said first threshold value.

22. The image signal processor according to claim 21, wherein said duplicate field detecting means detects said current field as a non-duplicate field when the cumulative value for a previous field of said plurality of fields preceding said current field is less than said second threshold value.

23. The image signal processor according to claim 21, wherein said duplicate field detecting means detects said current field as a duplicate field when the cumulative value for each of said plurality of fields preceding said current field is greater than said second threshold value.

24. The image signal processor according to claim 23, wherein said duplicate field detecting means detects said current field as a duplicate field when the cumulative value for four consecutive previous fields is greater than said second threshold value.

25. The image signal processing method according to claim 18, wherein said step of detecting whether a current field is a duplicate field determines that said current field is a non-duplicate field when the cumulative value for said current field is greater than said threshold for detecting a duplicate field and determines that said current field is a duplicate field when the cumulative value for said current field is less than said threshold for detecting a duplicate field and the cumulative values for said plurality of fields that immediately precede said current field are each greater than said threshold for detecting a non-duplicate field.

26. The image signal processing method according to claim 18, wherein the number of fields immediately preceding said current field is four.

27. The image signal processing method according to claim 18, wherein said step of detecting whether a field is a duplicate field determines that said current field is a non-duplicate field when the cumulative value of one of said plurality of fields that immediately precede said current field is less than said threshold for detecting a non-duplicate field.

28. An image signal processor, comprising:
  a duplicate field detector detecting a duplicate field of an image signal based on a first threshold value for detecting a duplicate field and data of a current field, said duplicate field detector determining whether said current field is a non-duplicate field by comparing said cumulative value for said current field of said image signal with said first threshold value and detecting said current field as a non-duplicate field when the cumulative value for said current field is greater than said first threshold value and by detecting, with a second threshold when said cumulative value for said current field is less than said first threshold value, a plurality of adjacent fields of said image with little motion, said adjacent fields being adjacent to said current field; and
  a duplicate field removing means for removing said duplicate field detected by said duplicate detector.

29. The image signal processor according to claim 21, wherein said duplicate field detecting means comprises:
  a subtracting means for obtaining a plurality of field differential values by comparing a plurality of first fields of said image signal and comparing a plurality of second fields of said image signal; and
  a duplicate field determining means for determining duplicate fields according to a pattern of appearance of duplicate and non-duplicate fields.

30. The image signal processor according to claim 29, wherein said duplicate field detecting means adjusts said threshold value for detecting a duplicate field based on a periodicity of said duplicate fields detected by said duplicate field determining means.

31. The image signal processor according to claim 30, further comprising:
  a memory for storing a plurality of results of detection made by said duplicate field determining means,
  wherein said duplicate field determining means decreases said threshold value for detecting a duplicate field when a pattern of appearance of duplicate and non-duplicate fields does not correspond with a predetermined pattern of appearance of duplicate and non-duplicate fields.

32. The image signal processor according to claim 31, wherein said duplicate field determining means increases said threshold value for detecting a duplicate field when a pattern of appearance of duplicate and non-duplicate fields corresponds with said predetermined pattern.

33. The image signal processor according to claim 29, wherein said duplicate field detecting means further comprises:
  an absolutizing means for obtaining a plurality of absolute values by absolutizing said field differential values; and
  a one-field cumulative adder means for obtaining a plurality of cumulative values by accumulating said absolute values, wherein each of said cumulative values relates to one of said first fields and said second fields, wherein
  said duplicate field determining means determines said duplicate field by comparing one of said cumulative values, which is said cumulative value of the current field, with said first threshold value for detecting a duplicate field and comparing the other cumulative values, which are cumulative values for said plurality of fields preceding said current field, with said second threshold value for detecting a non-duplicate field respectively.

34. The image signal processor according to claim 33, wherein said duplicate field detecting means further comprises:
  a threshold value determining means for determining said second threshold value for detecting a non-duplicate field based on said one of said cumulative values.

35. The image signal processor according to claim 34, wherein said threshold level determining means determines said second threshold value for detecting a duplicate field such that said second threshold value is in direct proportion to said one of said cumulative values.

36. The image signal processor according to claim 33, wherein
  said duplicate field determining means determines that said current field is a duplicate field when the cumulative value of each of said plurality of fields is greater than said second threshold value for detecting a non-duplicate field, the cumulative values of said plurality of fields relating to a predetermined number of fields which adjacently antecede said current field, said predetermined number being determined based on a field rate of a movie film and a field rate of said image signal.

37. The image signal processor according to claim 36, wherein said image signal is telecinema signal of 30 Hz produced from a movie film of 24 Hz, and said duplicate field determining means further comprises:
  a memory for storing said cumulative values;
  a means for determining that said current field is potentially a duplicate field by detecting that the cumulative value of said current field is smaller than said first threshold value for detecting a duplicate field; and
  a means for detecting that said potentially duplicate field is a duplicate field by detecting that four consecutive cumulative values are greater than said second threshold value for detecting a non-duplicate field, wherein said four consecutive cumulative values are for fields adjacent to said potentially duplicate field.

38. The image signal processor according to claim 29, wherein said duplicate field detecting means detects duplicate fields based on said image signal relating to partial data of a first field.

39. The image signal processor according to claim 29, said duplicate field detecting means further comprising:
  a field memory storing two fields of said image signal and outputting said image signal to said subtracting means;
  an absolutizing means for obtaining a plurality of absolute values by absolutizing said field differential values obtained by said subtracting means;
  a one-field cumulative adder means for obtaining a plurality of cumulative values by accumulating absolute values, wherein each of said cumulative values relates to one of said first fields and said second fields;
  a cumulative value memory for storing said cumulative values;
  a threshold value memory storing said threshold value for detecting a duplicate field; and
  a threshold value determining means for determining said threshold value for detecting a non-duplicate field based on one of said cumulative values, wherein
  said duplicate field determining means is operatively connected to said one-field cumulative adder means, said cumulative value memory, said threshold value memory, and said threshold value determining means, and determines said duplicate field by checking said pattern of appearance of duplicate and non-duplicate fields based on said first threshold value for detecting a duplicate field, said second threshold value for detecting a non-duplicate field, and said plurality of field differential values.

40. The image signal processor according to claim 29, wherein said duplicate field removing means removes one of said plurality of first fields which temporally antecedes and corresponds to a duplicate field detected by said duplicate field detecting means when said detected duplicate field corresponds to said plurality of first fields, and removes said detected duplicate field when said detected duplicate field corresponds to said plurality of second fields.

* * * * *